(12) United States Patent
Zhang et al.

(10) Patent No.: US 10,630,551 B2
(45) Date of Patent: Apr. 21, 2020

(54) METHOD AND APPARATUS FOR AUTOMATIC NETWORKING OF GATEWAY DEVICE

(71) Applicant: Huawei Technologies Co., Ltd., Shenzhen, Guangdong (CN)

(72) Inventors: Xiaotian Zhang, Wuhan (CN); Jin Li, Wuhan (CN); Hailong Zhao, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 276 days.

(21) Appl. No.: 15/565,125

(22) PCT Filed: Apr. 7, 2015

(86) PCT No.: PCT/CN2015/076014
§ 371 (c)(1),
(2) Date: Oct. 6, 2017

(87) PCT Pub. No.: WO2016/161564
PCT Pub. Date: Oct. 13, 2016

(65) Prior Publication Data
US 2018/0123891 A1     May 3, 2018

(51) Int. Cl.
*G06F 15/16* (2006.01)
*H04L 12/24* (2006.01)
(Continued)

(52) U.S. Cl.
CPC ...... *H04L 41/0886* (2013.01); *H04L 12/4625* (2013.01); *H04L 41/0809* (2013.01);
(Continued)

(58) Field of Classification Search
USPC ...................................................... 709/227
See application file for complete search history.

(56) References Cited

U.S. PATENT DOCUMENTS 9,185,072 B2 * 11/2015 Zou ................ H04L 61/251
9,191,362 B2 * 11/2015 Wang .............. H04L 61/2532
(Continued)

FOREIGN PATENT DOCUMENTS

| CN | 1649321 A | 8/2005 |
| CN | 102143509 A | 8/2011 |

(Continued)

OTHER PUBLICATIONS

Office Action issued in Chinese Application No. 201580064359.8 dated Apr. 25, 2019, 8 pages.
(Continued)

*Primary Examiner* — Alicia Baturay
(74) *Attorney, Agent, or Firm* — Fish & Richardson P.C.

(57) ABSTRACT

The method includes: after a first gateway device is connected to a second gateway device, determining, by the first gateway device, whether the second gateway device and the first gateway device are in a same home network; when the first gateway device and the second gateway device are in the same home network, switching, by the first gateway device, to be a bridge device of the second gateway device; receiving, by the first gateway device, a network parameter sent by the second gateway device, where the network parameter includes an SSID of the second gateway device and an Internet Protocol IP address assigned by the second gateway device to the first gateway device, and the IP address is an address in a network segment corresponding to the SSID; and performing, by the first gateway device, network configuration on the first gateway device according to the network parameter.

15 Claims, 7 Drawing Sheets

(51) Int. Cl.
*H04W 76/10* (2018.01)
*H04L 12/46* (2006.01)
*H04L 29/12* (2006.01)
*H04L 29/06* (2006.01)
*H04W 84/12* (2009.01)
*H04W 88/08* (2009.01)

(52) U.S. Cl.
CPC ...... *H04L 61/1511* (2013.01); *H04L 61/2007* (2013.01); *H04L 63/083* (2013.01); *H04L 65/102* (2013.01); *H04W 76/10* (2018.02); *H04W 84/12* (2013.01); *H04W 88/08* (2013.01)

(56) References Cited

U.S. PATENT DOCUMENTS

| | | | |
|---|---|---|---|
| 9,244,754 B2* | 1/2016 | Wang | H04L 12/2859 |
| 9,338,256 B2* | 5/2016 | Cheng | H04L 67/42 |
| 9,344,402 B2* | 5/2016 | Liu | H04L 61/2007 |
| 9,456,006 B2* | 9/2016 | Bi | H04L 67/14 |
| 9,654,529 B2* | 5/2017 | Xia | H04L 12/2809 |
| 10,004,102 B2* | 6/2018 | Chen | H04W 76/10 |
| 10,019,047 B2* | 7/2018 | Bull | G06F 1/26 |
| 10,020,960 B2* | 7/2018 | Wang | H04L 12/4633 |
| 10,244,086 B2* | 3/2019 | Newman, Jr. | H04L 69/18 |
| 10,305,930 B2* | 5/2019 | Benitez | H04L 63/0263 |
| 10,374,714 B2* | 8/2019 | Zhang | H04Q 11/0067 |
| 2004/0199610 A1* | 10/2004 | Nilson | H04L 12/4616 709/220 |
| 2005/0246431 A1 | 11/2005 | Spitaels | |
| 2005/0265257 A1* | 12/2005 | Masuda | H04L 12/2856 370/254 |
| 2006/0039360 A1 | 2/2006 | Thawani et al. | |
| 2007/0002783 A1 | 1/2007 | Krantz et al. | |
| 2007/0070935 A1 | 3/2007 | Prakash et al. | |
| 2008/0005345 A1* | 1/2008 | Roberts | H04L 29/12367 709/230 |
| 2009/0164611 A1* | 6/2009 | Corda | H04L 12/2898 709/222 |
| 2011/0188658 A1* | 8/2011 | Sakai | H04L 63/065 380/278 |
| 2011/0274029 A1 | 11/2011 | Connelly et al. | |
| 2012/0309371 A1 | 12/2012 | Yamada | |
| 2013/0103855 A1 | 4/2013 | Wang | |
| 2014/0310383 A1 | 10/2014 | Liu et al. | |
| 2016/0164699 A1* | 6/2016 | Ma | H04L 61/251 726/12 |
| 2016/0192403 A1* | 6/2016 | Gupta | H04L 12/18 455/411 |
| 2016/0261457 A1* | 9/2016 | Gupta | H04L 61/2015 |
| 2017/0272317 A1* | 9/2017 | Singla | H04L 41/0806 |
| 2017/0272507 A1* | 9/2017 | Hotchkiss | H04L 67/16 |
| 2017/0279664 A1* | 9/2017 | Zhang | H04L 12/283 |

FOREIGN PATENT DOCUMENTS

| | | |
|---|---|---|
| CN | 102651707 A | 8/2012 |
| CN | 102811502 A | 12/2012 |
| CN | 104009925 A | 8/2014 |
| KR | 20120036413 A | 4/2012 |
| RU | 2420875 C2 | 6/2011 |
| RU | 2431925 C2 | 10/2011 |

OTHER PUBLICATIONS

Tragos et al.; "Automatically configured, optimised and QoS aware wireless mesh networks"; 21st Annual IEEE International Symposium on Personal, Indoor and Mobile Radio Communications; Istanbul, Turkey; Sep. 26-29, 2010; 6 pages.

Grochla et al.,"Autoconfiguration procedures for multiradio wireless mesh networks based on DHCP protocol"; IEEE International Symposium on a World of Wireless, Mobile and Multimedia Networks & Workshops, 2009; Kos, Greece; Jun. 15-19, 2009; 6 pages.

K. Grochla; "IEEE 802.11 parameters DHCP Option" draft-ietf-dhc-80211-option-01; Aug. 27, 2010; 5 pages.

* cited by examiner

METHOD AND APPARATUS FOR AUTOMATIC NETWORKING OF GATEWAY DEVICE

CROSS-REFERENCE TO RELATED APPLICATION

This application is a national stage of International application Ser. No. PCT/CN2015/076014, filed on Apr. 7, 2015, which is hereby incorporated by reference in its entirety.

TECHNICAL FIELD

This application relates to the field of electronic technologies, and in particular, to a method and an apparatus for automatic networking of a gateway device.

BACKGROUND

As there are more home Wireless Fidelity (English: Wireless Fidelity, WiFi for short) devices, an increasingly large quantity of families implement network coverage in different rooms or on different floors by using multiple routers. For a networking manner among multiple routers in a home, a manner shown in FIG. 1 is provided in the prior art.

In FIG. 1, a router 1 is a top-level router of a home network and is connected to the Internet. The router 1 corresponds to a network segment 192.168.1.1 and a service set identifier (English: Service Set Identifier, for short: SSID) 1. A router 2 is cascaded with the router 1. The router 2 corresponds to a network segment 192.168.2.1 and an SSID 2. A router 3 is also cascaded with the router 1 and is disposed in parallel with the router 2. The router 3 corresponds to a network segment 192.168.3.1 and an SSID 3.

In a networking manner shown in FIG. 1, a WiFi device needs to use different SSIDs to connect to different routers, and Internet Protocol (English: Internet Protocol, IP for short) addresses of different network segments are assigned to the WiFi device. For example, a mobile phone needs to use the SSID 1 to connect to the router 1, and an IP address assigned to the mobile phone 1 is, for example, 192.168.1.2. A mobile phone 2 needs to use the SSID 2 to connect to the router 2, and an IP address assigned to the mobile phone 2 is 192.168.2.2. A mobile phone 3 needs to use the SSID 3 to connect to the router 3, and an IP address assigned to the mobile phone 3 is 192.168.3.2. Therefore, the mobile phone 1, the mobile phone and the mobile phone 3 are located in different sub-local area networks, and the mobile phone 1, the mobile phone 2, and the mobile phone 3 cannot be interconnected and communicate with each other.

It may be learned from above that in the cascade networking manner shown in FIG. 1, user equipments that are connected to different gateway devices cannot communicate with each other.

SUMMARY

Embodiments of this application provide a method and an apparatus for automatic networking of a gateway device, to resolve a technical problem that in a cascade networking manner in the prior art, user equipments connected to different gateway devices cannot communicate with each other.

A first aspect of this application provides a method for automatic networking of a gateway device, including:

after a first gateway device is connected to a second gateway device, determining, by the first gateway device, whether the second gateway device and the first gateway device are in a same home network;

when the first gateway device and the second gateway device are in the same home network, switching, by the first gateway device, to be a bridge device of the second gateway device;

receiving, by the first gateway device, a network parameter sent by the second gateway device, where the network parameter includes a service set identifier SSID of the second gateway device and an Internet Protocol IP address assigned by the second gateway device to the first gateway device, and the IP address is an address in a network segment corresponding to the SSID; and performing, the first gateway device, network configuration according to the network parameter.

With reference to the first aspect, in a possible implementation manner of the first aspect, the determining, by the first gateway device, whether the second gateway device and the first gateway device are in a same home network includes:

sending, by the first gateway device, search information to the second gateway device, where the search information includes a network identifier;

receiving, by the first gateway device, response information of the second gateway device, where the response information is generated based on the network identifier; and determining, by the first gateway device according to the response information, whether the second gateway device and the first gateway device are in the same home network.

With reference to the first possible implementation manner of the first aspect, in a second possible implementation manner of the first aspect, before the sending, by the first gateway device, search information to the second gateway device, the method further includes:

determining, by the first gateway device, that the first gateway device is not set to a cascaded mode, where in the cascaded mode, the first gateway device is a cascaded device of another network device.

A second aspect of this application provides a method for automatic networking of a gateway device, including:

after a first gateway device is connected to a second gateway device, receiving, by the second gateway device, search information sent the first gateway device where the search information includes a network identifier;

determining, by the second gateway device according to the network identifier, whether the second gateway device and the first gateway device are in a same home network;

when the second gateway device and the first gateway device are in the same home network, sending, by the second gateway device, response information to the first gateway device to instruct the first gateway device to switch to be a bridge device of the second gateway device; and sending, by the second gateway device, a network parameter to the first gateway device, where the network parameter includes service set identifier SSID of the second gateway device and an Internet Protocol IP address assigned by the second gateway device to the first gateway device, and the IP address is an address in a network segment corresponding to the SSID.

With reference to the second aspect, in a first possible implementation manner of the second aspect, after the sending, by the second gateway device, a network parameter to the first gateway device, the method further includes:

when the network parameter is updated, sending, the second gateway device, an updated network parameter to the first gateway device.

A third aspect of this application provides an apparatus for automatic networking of a gateway device, including:

processing unit, configured to: after the gateway device is connected to a second gateway device, determine whether the second gateway device and the gateway device are in a same home network, where the processing unit further configured to: when the gateway device and the second gateway device are in the same home network, switch the first gateway device to be a bridge device of the second gateway device; and receiving unit, configured to receive a network parameter sent the second gateway device, where the network parameter includes a service set identifier SSID of the second gateway device and an Internet Protocol IP address assigned by the second gateway device to the gateway device, and the IP address is an address in a network segment corresponding to the SSID, where the processing unit is further configured to perform network configuration on the gateway device according to the network parameter.

With reference to the third aspect, in first possible implementation manner of the third aspect, the apparatus further includes a sending unit, and the processing unit is specifically configured to: send search information to the second gateway device using the sending unit, where the search information includes a network identifier; receive response information of the second gateway device by using the receiving unit, where the response information is generated based on the network identifier; and determine, according to the response information, whether the second gateway device and the gateway device are in the same home network.

With reference to the first possible implementation manner of the third aspect, in a second possible implementation manner of the third aspect, the processing unit is further configured to: before sending the search information to the second gateway device by using the sending unit, determine that the gateway device not set to a cascaded mode, where in the cascaded mode, the gateway device is a cascaded device of another network device.

A fourth aspect of this application provides an apparatus for automatic networking of a gateway device, including:

a receiving unit, configured to: after a first gateway device is connected to the gateway device, receive search information sent by the first gateway device, where the search information includes a network identifier;

a processing unit, configured to determine, according to the network identifier, whether the gateway device and the first gateway device are in a same home network; and a sending unit, configured to: when the gateway device and the first gateway device are in the same home network, send response information to the first gateway device to instruct the first gateway device to switch to be a bridge device of the gateway device; and send a network parameter to the first gateway device, where the network parameter includes a service set identifier SSID of the gateway device and an Internet Protocol IP address assigned by the gateway device to the first gateway device, and the IP address is an address in a network segment corresponding the SSID.

With reference to the fourth aspect, in a first possible implementation manner of the fourth aspect, the sending unit is further configured to: when the network parameter is updated, send an updated network parameter to the first gateway device.

A fifth aspect of this application provides a gateway device, including:

a processor, configured to: after the gateway device is connected to a second gateway device, determine whether the second gateway device and the gateway device are in a same home network, where the processor further configured to: when the gateway device and the second gateway device are in the same home network, switch the first gateway device to be a bridge device of the second gateway device; and a receiver, configured to receive a network parameter sent by the second gateway device, where the network parameter includes a service set identifier SSID of the second gateway device and an Internet Protocol IP address assigned by the second gateway device to the gateway device, and the IP address is an address in a network segment corresponding to the SSID, where the processor is further configured to perform network configuration on the gateway device according to the network parameter.

With reference to the fifth aspect, in a first possible implementation manner of the fifth aspect, the gateway device further includes a transmitter, and the processor is specifically configured to: send search information to the second gateway device by using the transmitter, where the search information includes a network identifier; receive response information of the second gateway device by using the receiver, where the response information is generated based on the network identifier; and determine, according to the response information, whether the second gateway device and the gateway device are in the same home network.

With reference to the first possible implementation manner of the fifth aspect, in a second possible implementation manner of the fifth aspect, the processor is further configured to: before sending the search information to the second gateway device by using the transmitter, determine that the gateway device is not set to a cascaded mode, where in the cascaded mode, the gateway device is a cascaded device of another network device.

A sixth aspect of this application provides a gateway device, including:

a receiver, configured to: after a first gateway device is connected to the gateway device, receive search information sent by the first gateway device, where the search information includes a network identifier;

a processor, configured to determine, according to the network identifier, whether the gateway device and the first gateway device are in a same home network; and a transmitter, configured to: when the gateway device and the first gateway device are in the same home network, send response information to the first gateway device to instruct the first gateway device to switch to be a bridge device of the gateway device; and send a network parameter to the first gateway device, where the network parameter includes a service set identifier SSID of the gateway device and an Internet Protocol IP address assigned by the gateway device to the first gateway device, and the IP address is an address in a network segment corresponding to the SSID.

With reference to the sixth aspect, in a first possible implementation manner of the sixth aspect, the transmitter is further configured to: when the network parameter is updated, send an updated network parameter to the first gateway device.

The one or more technical solutions provided in the embodiments of this application have at least the following technical effects or advantages:

In the embodiments of this application, all gateway devices in a home network use a same network parameter, no matter how many gateway devices there are physically, and from whichever gateway device user equipment connects to the home network, the user equipment uses the same network parameter, and an IP address is an IP address in a network segment corresponding to an upper-level gateway device. Therefore, all user equipments are connected to a same local area network, and multiple user equipments can communicate with each other, thereby facilitating use by a user.

DESCRIPTION OF EMBODIMENTS

Embodiments of this application provide a method and an apparatus for automatic networking of a gateway device, to resolve a technical problem that in a cascade networking manner in the prior art, user equipments connected to different gateway devices cannot communicate with each other.

In technical solutions in the embodiments of the present invention, to resolve the foregoing technical problem, a general idea is as follows:

Network parameters of gateway devices in a same home network are set to be a same network parameter. In this way, to whichever gateway device user equipment is connected, the user equipment uses the same network parameter, and different user equipments are in a same network segment, that is, are in a same sub-local area network. Therefore, these user equipments may communicate with each other, thereby facilitating use by a user.

To make the objectives, technical solutions, and advantages of the embodiments of this application clearer, the following clearly and completely describes the technical solutions in the embodiments of this application with reference to the accompanying drawings in the embodiments of this application. Apparently, the described embodiments are merely a part rather than all of the embodiments of this application. All other embodiments obtained by a person of ordinary skill in the art based on the embodiments of this application without creative efforts shall fall within the protection scope of this application.

Figure 1:
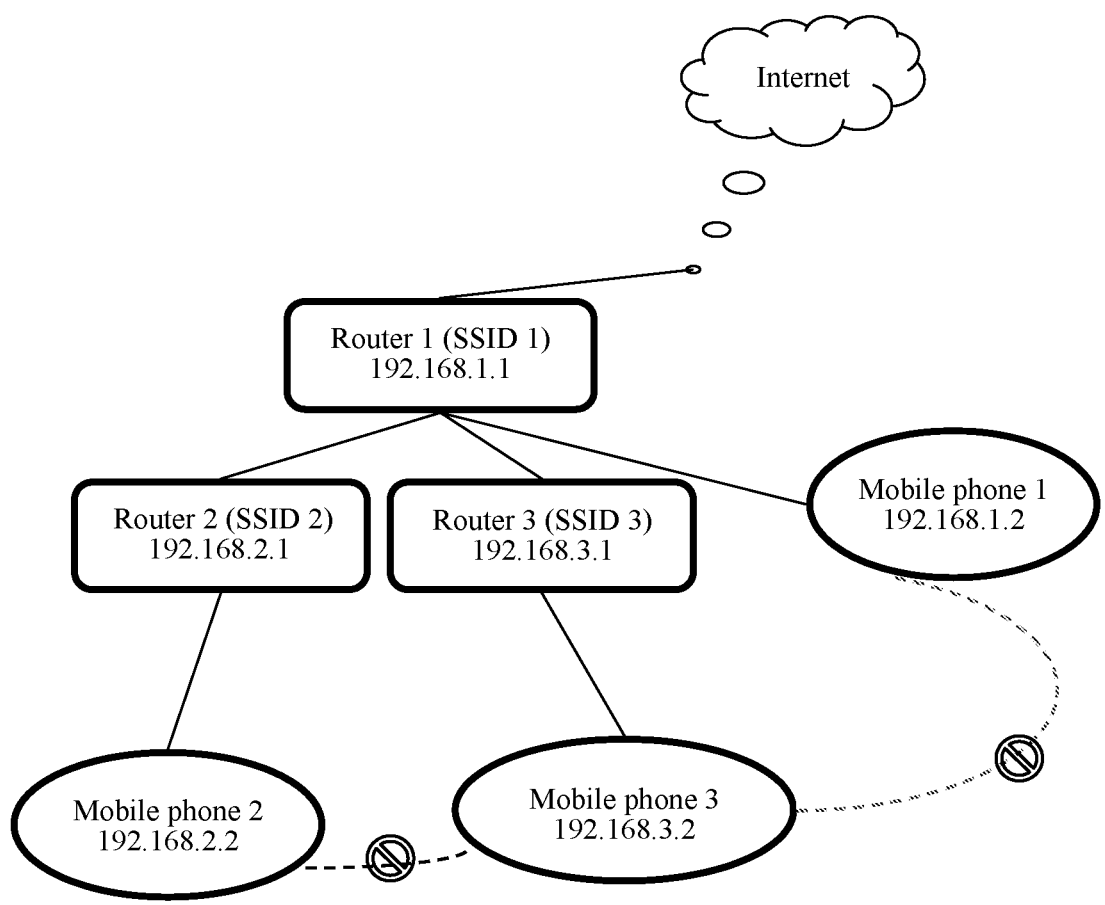
FIG. 1 is a schematic diagram of networking of multiple routers and connection of user equipments in the prior art.
Figure 2:
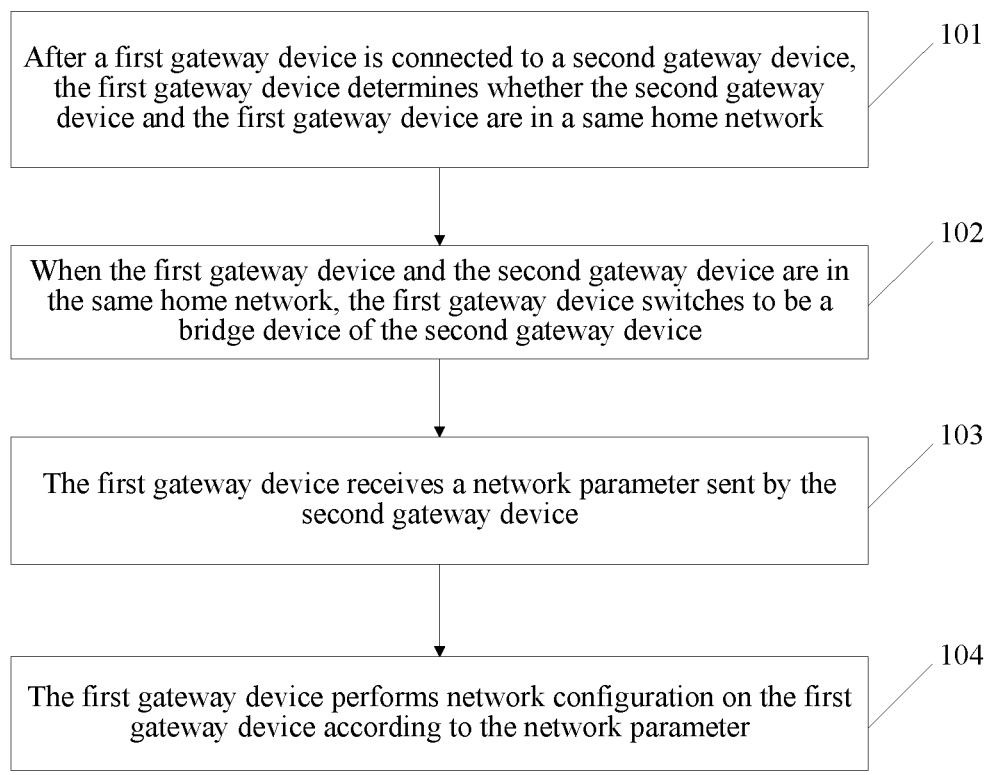
FIG. 2 is a flowchart of a networking method on a side of a first gateway device according to an embodiment of this application.

Referring to FIG. 2, FIG. 2 is a flowchart of a method for automatic networking of a gateway device according to an embodiment of this application. A flowchart of a networking method on a side of a first gateway device shown in this embodiment. As shown in FIG. 2, the method includes the following steps.

Step 101: After a first gateway device is connected to a second gateway device, the first gateway device determines whether the second gateway device and the first gateway device are in a same home network.

Step 102: When the first gateway device and the second gateway device are in the same home network, the first gateway device switches to be a bridge device of the second gateway device.

Step 103: The first gateway device receives a network parameter sent by the second gateway device.

Step 104: The first gateway device performs network configuration on the first gateway device according to the network parameter.

The first gateway device is connected to the second gateway device, and during actual application, there may be two cases. In a first case, the second gateway device is a modem or a network device having a similar function of the modem, and is connected to an external metropolitan area network, a wide area network or another Internet. The first gateway device is a network device such as a router, a hub or a switch that is configured to establish a local area network. In this case, the first gateway device may be connected to the second gateway device by using a network cable or another manner. In a second case, the second gateway device is a network device such as a router, a hub or a switch that is configured to establish a local area network. The second gateway device is connected to an external metropolitan area network, a wide area network or another Internet by using a modem or a network device having a similar function of the modem. The first gateway device is also a network device such as a router, a hub or a switch that is configured to establish a local area network. The first gateway device may connect to the second gateway device by using the network parameter provided by the second gateway device. The first gateway device and the second gateway device may be connected by using a network cable or in a wireless connection manner.

In the two cases above, when the first gateway device connects to the second gateway device, the second gateway device assigns an SSID and an IP address segment to the first gateway device. For example, in the second case, it is assumed that an SSID corresponding to the second gateway device is an SSID 4, and a corresponding IP address segment is a second IP address segment. When the first gateway device connects to the second gateway device, an SSID assigned by the second gateway device to the first gateway device is an SSID 5, and an assigned IP address segment is a first IP address segment. In this case, the first gateway device is already connected to the second gateway device, and the first gateway device can communicate with the second gateway device.

During actual application, the first gateway device and the second gateway device may further be connected to each other in another form and can communicate with each other. This is not limited in this application.

In this case, step 101 of determining whether the first gateway device and the second gateway device are in a same home network may be performed.

In a first possible implementation manner, step 101 includes: sending, by the first gateway device, search information to the second gateway device, where the search information includes a network identifier; receiving, by the first gateway device, response information of the second gateway device, where the response information is generated based on the network identifier; and determining, by the first gateway device according to the response information, whether the second gateway device and the first gateway device are in the same home network.

In a second possible implementation manner, step 101 includes: sending, by the first gateway device, search information to the second gateway device, where the search information includes a network identifier; and when response information sent by the second gateway device is not received within preset duration, determining that the second gateway device and the first gateway device are not in the same home network; or when a response message sent by the second gateway device is received within preset duration, determining that the second gateway device and the first gateway device are in the same home network. The response information is generated based on the network identifier.

In this embodiment of this application, the network identifier is used to indicate whether multiple gateway devices having a same network identifier or consistent network identifiers are in a same home network. The network identifier may be specifically a pre-determined value, and may be carried on delivery or may be set by a user. A specific case is described in detail below.

In a first example of step 101, the first gateway device sends a search packet to the second gateway device by using the Universal Plug and Play (English: Universal Plug and Play, for short: UPnP) protocol. Specifically, a search target (Search Target) in the search packet is an agreed fixed value, for example, "urn:schemas-upnp-org:service:NetworkSync-Service:1". In this case, the network identifier is the fixed value, and is the agreed value.

When receiving the search information, the second gateway device generates a response message based on the network identifier, and sends response information back to the first gateway device. Correspondingly, the first gateway device receives the response information. When finding that the fixed value is a pre-agreed fixed value, the second gateway device may send positive response information. When the second gateway device finds that the fixed value is not the pre-agreed fixed value or the second gateway device does not store the fixed value, the second gateway device may send negative response information.

Therefore, the first gateway device may determine whether the first gateway device and the second gateway device are in the same home network according to the positive response message or the negative response message.

For example, in the foregoing first case, the second gateway device is a network device in an external network. Therefore, after the first gateway device is connected to the second gateway device, a received response message is a negative response message. In this case, the first gateway device may learn that the first gateway device is a top-level gateway device in the home network. In this case, user equipment may connect to the first gateway device according to an existing manner.

In the foregoing second case, the second gateway device is already a top-level gateway device in a local area network such as a home network. Therefore, after the first gateway device is connected to the second gateway device and sends the search information to the second gateway device, the second gateway device may determine that the fixed value sent by the first gateway device is the agreed value, so that the second gateway device sends the positive response message to the first gateway device. After receiving the positive response message, the first gateway device may determine that the first gateway device and the second gateway device are in the same home network.

In a second example of step 101, the first gateway device sends search information to the second gateway device by using the Multicast Domain Name System (English: Multicast Domain Name System, MDNS for short) protocol. Specifically, the first gateway device may send a multicast query request by using the MDNS protocol to query whether there is a network synchronization (NetworkSync) service in a current network. If the second gateway device has the service, the second gateway device returns an IP address and a port served by the second gateway device. The first gateway device may complete notification to the second gateway device by using the IP address and the port, and determines that the first gateway device and the second gateway device are in the same horse network. In this embodiment, the network identifier is an identifier of a service, that is, NetworkSync.

The foregoing first example and second example are examples for description. During actual application, the search information may be sent to the second gateway device in another manner. This is not specifically limited in this application.

In a further embodiment, before the sending, by the first gateway device, search information to the second gateway device, the method further includes: determining, by the first gateway device, that the first gateway device is not set to a cascaded mode, where in the cascaded mode, the first gateway device is a cascaded device of another network device.

For example, assuming that a switching button is disposed on the first gateway device, when the switching button is in a first state, the first gateway device can operate in only the cascaded mode. In this case, a networking manner is the same as the networking manner described in the Background. When the switching button is in a second state, it indicates that the first gateway device is not set to the cascaded mode, so that networking methods described in FIG. 2 of this application and the embodiment of FIG. 2 may be performed.

When it is determined in any of the foregoing manners that the second gateway device and the first gateway device are in the same home network, subsequently step 102 in which the first gateway device switches to be a bridge device of the second gateway device is performed.

Specifically, the first gateway device switches to be the bridge device of the second gateway device, that is, an operating mode of the first gateway device is switched to be a bridge mode. For example, the first gateway device is a router, and the router has a routing mode and a bridge mode. Usually, in the bridge mode, an IP packet sent by a device attached to a gateway device is directly and transparently transmitted to an upper-level network. In an IP layer, the gateway device in the bridge mode is transparent. In this case, an IP address is not assigned to the attached device, and the IP packet of the attached device is not modified either. A specific operating principle in the bridge mode or the routing mode is content well-known by a person skilled in the art, and is not described herein again.

For example, when receiving the positive response information sent by the second gateway device, the first gateway device adjusts the operating mode of the first gateway device to the bridge mode.

In step 103, the first gateway device receives a network parameter that is of the second gateway device and that is sent by the second gateway device. Specifically, the first gateway device may receive the positive response information while receiving the network parameter. For example, when the second gateway device finds that the fixed value in the search information is an agreed value, the second gateway device may determine that the first gateway device and the second gateway device are in the same home network, so that while sending the positive response information, the second gateway device sends the network parameter of the second gateway device to the first gateway device.

Certainly, step 103 may also be performed after step 102.

Usually, the network parameter includes an SSID of the second gateway device and an IP address assigned to the first gateway device. The assigned IP address is an address in a network segment corresponding to the SSID of the second gateway device. The network parameter further includes a parameter such as a data encryption manner. The IP address is used for the first gateway device to communicate with another device, for example, to communicate with the user equipment and the second gateway device.

Optionally, if the second gateway device further needs to perform password authentication, the network parameter further includes an authentication password.

For example, the network parameter includes the SSID 4 and an IP address, in the second IP address segment.

After receiving the network parameter, the first gateway device performs step 104 of performing network configuration on the first gateway device according to the network parameter. For example, the first gateway device replaces the SSID 5 with the SSID 4, and replaces an IP address of the first gateway device with a newly-assigned IP address. Further, the authentication password is also replaced with a received authentication password.

After the network configuration is performed, when the user equipment searches for a network, the user equipment finds the SSID.

For example, in this case, SSIDs of the first gateway device and the second gateway device are both the SSID 4. Therefore, when the user equipment searches a network, the user equipment finds a wireless network SSID 4. Relatively strong network signals are found at both a position near the first gateway device and a position near the second gateway device.

Figure 3:
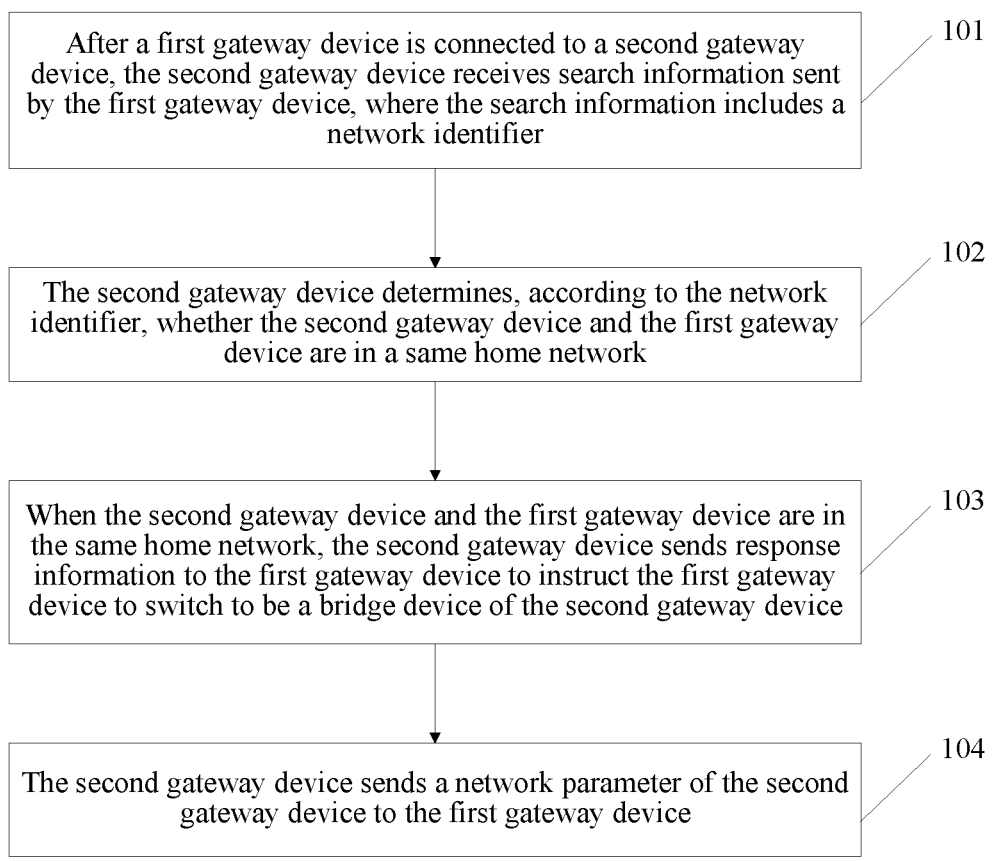
FIG. 3 is a flowchart of a networking method on a side of a second gateway device according to an embodiment of this application.

Next, referring to FIG. 3, FIG. 3 is a flowchart of a networking method on a side of a second gateway device according to an embodiment of this application. As shown in FIG. 3, the method includes the following steps.

Step 201: After a first gateway device is connected to a second gateway device, the second gateway device receives search information sent by the first gateway device, where the search information includes a network identifier.

Step 202: The second gateway device determines, according to the network identifier, whether the second gateway device and the first gateway device are in a same home network.

Step 203: When the second gateway device and the first gateway device are in the same home network, the second gateway device sends response information to the first gateway device to instruct the first gateway device to switch to be a bridge device of the second gateway device.

Step 204: The second gateway device sends a network parameter to the first gateway device.

In step 204, the meaning of the network parameter is the same as the meaning of the network parameter in the foregoing step 103.

For specific implementation processes of step 201 and step 202, refer to the foregoing description and details are not described herein again for conciseness of this specification.

Similarly, step 203 and step 204 may be performed simultaneously, or step 203 may be performed first before step 204.

Optionally, when the second gateway device determines that the second gateway device and the first gateway device are not in the home network, the second gateway device may send negative response information or does not send response information.

Optionally, after step 204, the method further includes: when the network parameter is updated, the second gateway device sends an updated network parameter to the first gateway device. Correspondingly, when receiving the updated network parameter, the first gateway device performs network configuration again according to the updated network parameter, to keep synchronization of network parameters of the two gateway devices.

FIG. 2 and FIG. 3 describe an entire networking process respectively from the side of the first gateway device and the side of the second gateway device. After networking is completed, the first gateway device is in a bridge mode. The network parameter of the first gateway device and the network parameter of the second gateway device are the same.

During actual application, in addition to the networking methods described in FIG. 2 and FIG. 3, a networking structure in which the first gateway device is the bridge device of the second gateway device may further be obtained in another networking manner. Regardless of a manner of networking, when the first gateway device is used as the bridge device of the second gateway device and the network parameter of the first gateway device and the network parameter of the second gateway device are synchronized, how to connect user equipment to a local area network established by the second gateway device is described below.

How to connect the user equipment such as a mobile phone, a tablet computer, and a notebook computer to the local area network through the second gateway device, that is, a process of connecting the user equipment to the second gateway device is similar to that in the prior art, so that details are not described herein again.

Figure 4:
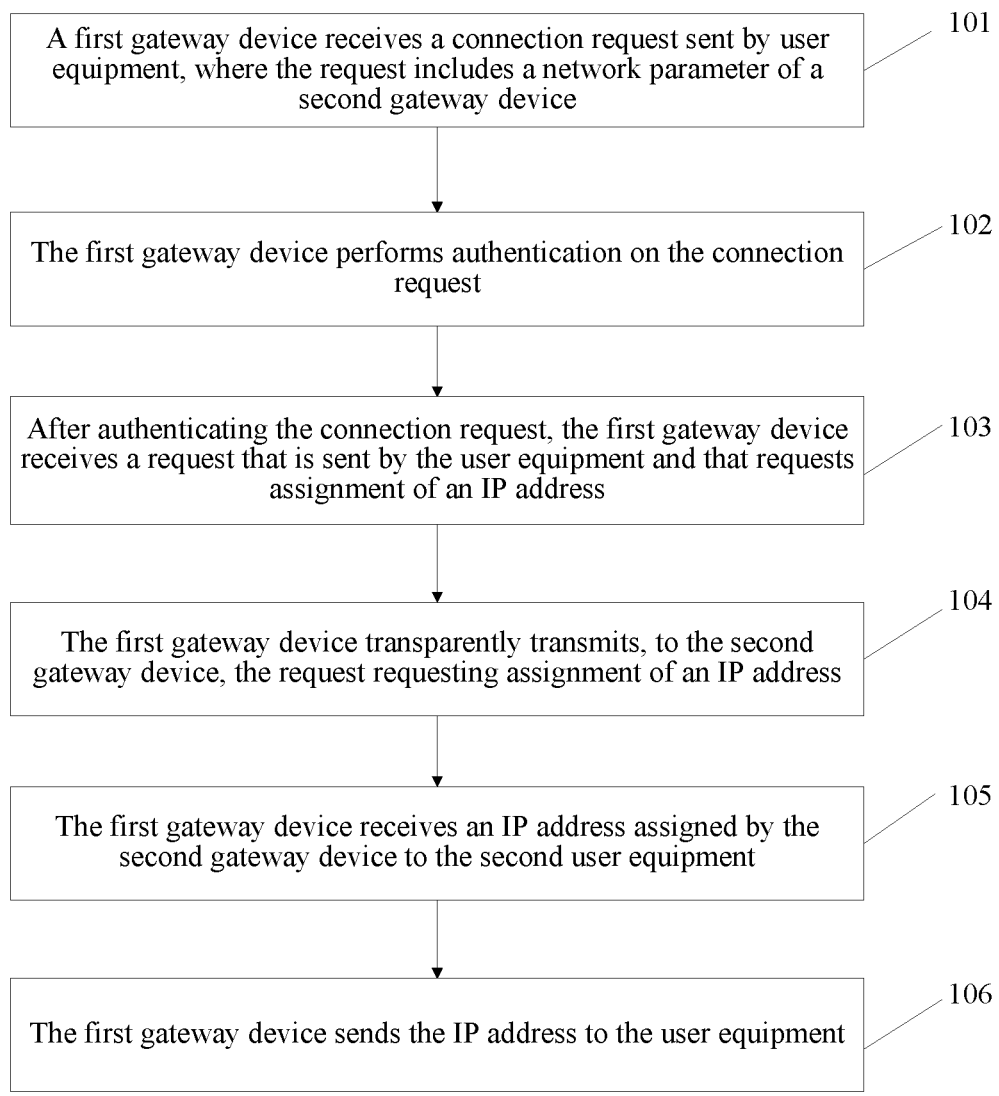
FIG. 4 is a flowchart of a method for establishing a connection to a gateway device according to an embodiment of this application.

As for how to connect the user equipment to the local area network through the first gateway device, refer to FIG. 4 for details. FIG. 4 is a flowchart of a method for establishing a connection to a gateway device according to an embodiment of this application. As shown in FIG. 4, the method includes the following steps.

Step 301: The first gateway device receives a connection request sent by the user equipment, where the request includes a network parameter of a second gateway device.

Step 302: The first gateway device performs authentication on the connection request.

Step 303: After the connection request is authenticated by the first gateway device, the first gateway device receives a request that is sent by the user equipment and that requests assignment of an IP address.

Step 304: The first gateway device transparently transmit to the second gateway device, the request requesting assignment of an IP address.

Step 305: The first gateway device receives an IP address assigned by the second gateway device to the second user equipment.

Step 306: The first gateway device sends the IP address to the user equipment.

In step 301, the first gateway device receives the connection request of the user equipment. Specifically, for example, a user finds a wireless network through network scanning, and chooses to connect to the wireless network. After entering a correct password, the user clicks a "Connect" button. Because in this case, the user equipment is near the first gateway device the user equipment sends a connection request to the first gateway device. The connection request includes an SSID of the second gateway device and the password.

After receiving the connection request, the first gateway device performs authentication on the request. Specifically, the first gateway device performs authentication to determine whether the password is correct. If the password is correct, it indicates that the password is authenticated.

After the password is authenticated, the first gateway device further receives the request that is sent by the user equipment and that requests assignment of an IP address.

In this case, the first gateway device is used as a bridge device of the second gateway device, and the first gateway device exerts an effect of strengthening a signal but cannot process the request requesting assignment of an IP address. Therefore, the first gateway device performs step 304 of transparently transmitting, to the second gateway device, the request requesting assignment of an IP address.

After receiving the request that is transparently transmitted the first gateway device and that requests assignment of an IP address, the second gateway device assigns an IP address in a network segment of the second gateway device to the user equipment, and sends the assigned IP address to the first gateway device again. Correspondingly the first gateway device performs step 305.

After receiving the IP address assigned by the second gateway device to the user equipment, the first gateway device performs step 306 of sending the IP address to the user equipment. In this way, the user equipment is connected to the local area network.

A specific application scenario of the networking method and establishment of a connection to a gateway device in this embodiment of this application is provided as an example.

Figure 5:
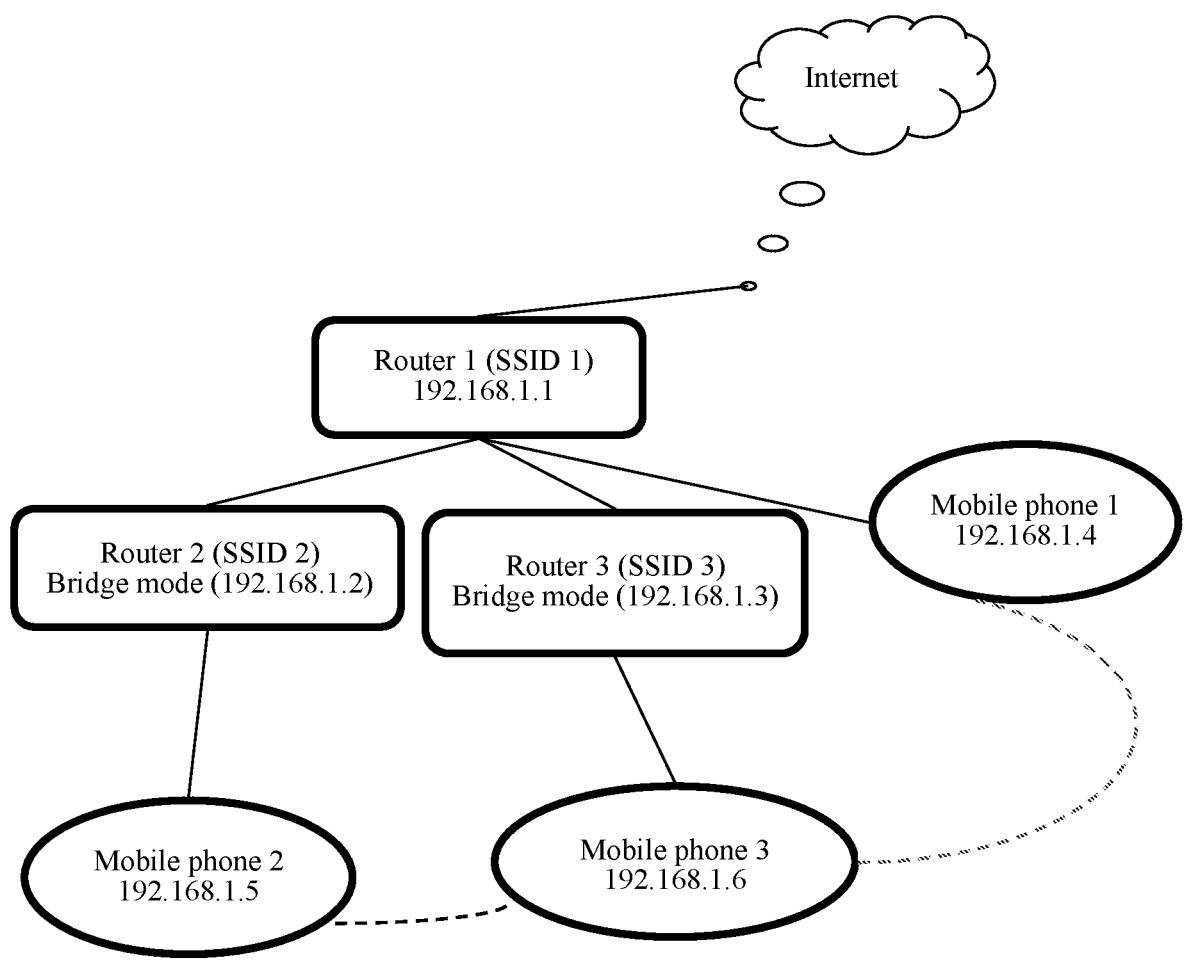
FIG. 5 is a schematic diagram of networking of multiple routers and connection of user equipments according to an embodiment of this application.

Referring to FIG. 5, it is assumed that a router 1 connects to the Internet using a network device such as a modem. An SSID corresponding to the router 1 is an SSID 1, and a network segment corresponding to the router 1 is 192.168.1.1. After being connected to the router 1, both a router 2 and a router 3 perform the networking method described in FIG. 2 and the embodiment of FIG. 2. Therefore, the router 2 and the router 3 separately operate in a bridge mode, and become bridge devices of the router 1. The router 1 sends the SSID of the router 1 to the router 2 and the router 3. Therefore, the router 2 and the router 3 set SSIDs of the router 2 and the router 3 to be the SSID 1. An IP address of the router 2 is changed to an IP address, 192.168.1.2, assigned by the router 1 to the router 2. An IP address of the router 3 is changed to an IP address, 192.168.1.3, assigned by the router 1 to the router 3.

It is assumed that the router 1 is placed in a living room and the router 2 and router 3 are respectively placed in a master bedroom and a guest room. In this way, in this home, network signals that a user sees in the living room, the master bedroom, and the guest room are all strong, thereby implementing network coverage of each room.

It is assumed that a first family member carries a mobile phone 1 in a position in the living room. The first family member performs network scanning by using the mobile phone 1 to find an SSID 1, and then sends a connection request. Because the first family member is near the router 1, the connection request is sent to the router 1. A connection process is the same as that in the prior art. After the mobile phone 1 is connected, an IP address assigned to the mobile phone 1 is 192.168.1.4.

It is assumed that a second family member carries a mobile phone 2 and is in the master bedroom. The second family member performs network scanning by using the mobile phone 2 to find the SSID 1, and then sends a connection request. Because the second family member is near the router 2, the connection request is sent to the router 2. A specific connection method is the same as the method described in FIG. 4 and the embodiment of FIG. 4. After the mobile phone 2 is connected, an IP address assigned by the router 1 to the mobile phone 2 is 192.168.1.5.

Similarly, a mobile phone 3 is connected to a router 3, and an IP address assigned by the router 3 to the mobile phone 3 is 192.168.1.6.

It may be seen that although the mobile phone 1, the mobile phone 2, and the mobile phone 3 are connected by using different routers, the mobile phone 1, the mobile phone 2, and the mobile phone 3 eventually are connected to the local area network established by the router 1. Therefore, the mobile phone 1, the mobile phone 2, and the mobile phone 3 may communicate with each other. For example, the first family member shares a file in a group, and another family member may view the file shared by the user equipment in the group.

It may be seen from the description above that by means of the networking manner in this embodiment of this application, all gateway devices in a home network use a same network parameter, no matter how many gateway devices there are physically, and from whichever gateway device user equipment connects to the home network, the user equipment uses the same network parameter, and an IP address is an IP address in a network segment corresponding to an upper-level gateway device. Therefore, all user equipments are connected to a same local area network, and multiple user equipments can communicate with each other, thereby facilitating use by a user.

Further, the networking manner in this embodiment of this application is automatically triggered by the first gateway device, and an entire networking process is performed automatically without needing the participation of a user. Therefore, for the user, the method is more convenient and simpler, and reduces a networking cost.

Figure 6:
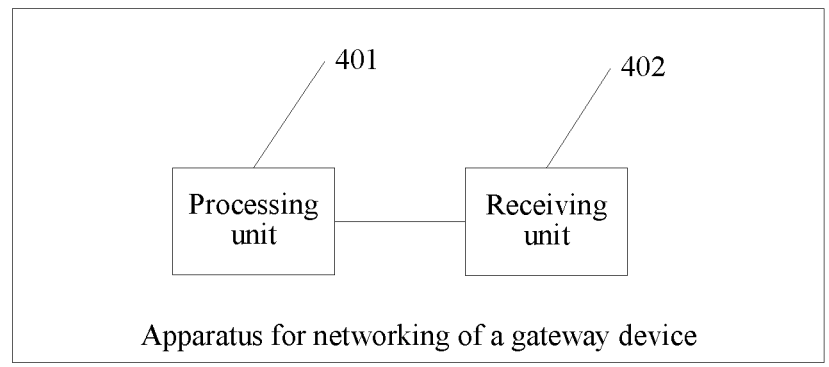
FIG. 6 is a functional block diagram of an apparatus for networking of a gateway device according to an embodiment of this application.

Based on a same inventive concept, referring to FIG. 6, FIG. 6 is a functional block diagram of an apparatus for networking of a gateway device according to an embodiment of this application. The apparatus is configured to implement the method for networking of a gateway device shown in FIG. 2 of the present invention. For meanings of terms involved in this embodiment, refer to content described in the foregoing embodiment. The apparatus for networking of a gateway device includes: a processing unit 401, configured to: after the gateway device is connected to a second gateway device, determine whether the second gateway device and the gateway device are in a same home network, where the processing unit 401 is further configured to: when the gateway device and the second gateway device are in the same home network, switch a first gateway device to be a bridge device of the second gateway device; and a receiving unit 402, configured to receive a network parameter sent by the second gateway device, where the network parameter includes an SSID of the second gateway device and an IP address assigned by the second gateway device to the gateway device, and the IP address is an address in a network segment corresponding to the SSID, where the processing unit 401 is further configured to perform network configuration on the gateway device according to the network parameter.

Optionally, the apparatus further includes a sending unit, and the processing unit 401 is specifically configured to: send search information to the second gateway device by using the sending unit, where the search information includes a network identifier; receive response information of the second gateway device by using the receiving unit 402, where the response information is generated based on the network identifier; and determine, according to the response information, whether the second gateway device and the gateway device are in the same home network.

Optionally, the processing unit 401 is further configured to: before sending the search information to the second gateway device by using the sending unit, determine that the gateway device is not set to a cascaded mode, where in the cascaded mode, the gateway device is a cascaded device of another network device.

Various changed manners and specific examples of the method for networking of a gateway device in the foregoing embodiment of FIG. 2 are also applicable to the apparatus for networking of a gateway device in this embodiment. By means of detailed description at the foregoing method for networking of a gateway device, a person skilled in the art may clearly know an implementation method of the apparatus for networking of gateway device in this embodiment. Therefore, for conciseness of this specification, details are not described herein again.

Figure 7:
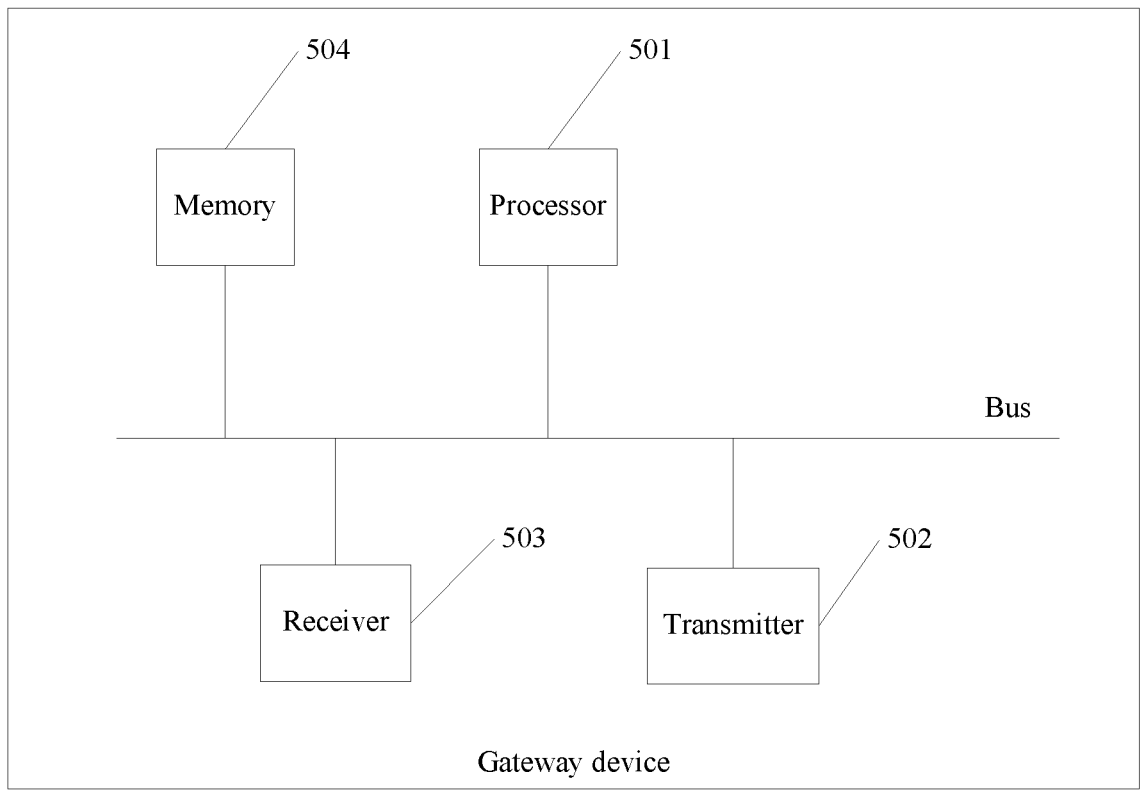
FIG. 7 is a systematic block diagram of a gateway device according to an embodiment of this application.

Based on a same inventive concept, referring to FIG. 7, FIG. 7 is a systematic block diagram of a gateway device according to an embodiment of this application. The apparatus configured to implement the method for networking of a gateway device shown in FIG. 2 of the present invention. For meanings of terms involved in this embodiment, refer to content described in the foregoing embodiment. The gateway device includes: a processor 501, a transmitter 502, receiver 503, and a memory 504. The processor 501 may be specifically a general purpose central processing unit (CPU), or may be an application specific integrated circuit (English: Application Specific Integrated Circuit, ASIC for short), or may be one or more integrated circuits configured to control execution of a program. There may be one or more memories 504. The memory 504 may include a read-only memory (English: Read Only Memory, ROM for short), a random access memory (English: Random Access Memory, RAM for short), and a magnet disk storage. The memories, the receiver 503, and the transmitter 502 are connected to the processor 501 using a bus. The receiver 503 and the transmitter 502 are configured to perform network communication with an external device, and may communicate with the external device specifically by using an Ethernet network, a radio access network, a wireless local area network, and the like. The receiver 503 and the transmitter 502 may be two elements physically independent of each other, or may be physically a same element.

The memory 504 may store an instruction, and the processor 501 may execute the instruction stored in the memory 504.

Specifically, the processor 501 is configured to: after the gateway device is connected to a second gateway device, determine whether the second gateway device and the gateway device are in a same home network. The processor 501 is further configured to: when the gateway device and the second gateway device are in the same home network, switch a first gateway device to be a bridge device of the second gateway device. The receiver 503 is configured to receive a network parameter sent by the second gateway device, where the network parameter includes an SSID of the second gateway device and an IP address assigned the second gateway device to the gateway device, and the IP address is an address in a network segment corresponding to the SSID. The processor 501 is further configured to perform network configuration on the gateway device according to the network parameter.

Optionally, the gateway device further includes a transmitter 502, and the processor 501 is specifically configured to: send search information to the second gateway device by using the transmitter 502, where the search information includes a network identifier; receive response information of the second gateway device by using the receiver 503, where the response information is generated based on the network identifier; and determine, according to the response information, whether the second gateway device and the gateway device are in the same home network.

Optionally, the processor 501 is further configured to: before sending the search information to the second gateway device by using the transmitter 502, determine that the gateway device is not set to a cascaded mode, where in the cascaded mode, the gateway device is a cascaded device of another network device.

Various changed manners and specific examples of the method for networking of a gateway device in the foregoing embodiment of FIG. 2 are also applicable to the gateway device in this embodiment. By means of the detailed description of the foregoing method for networking of a gateway device, a person skilled in the art may clearly know an implementation method of the gateway device in this embodiment. Therefore, for conciseness of this specification, details are not described herein again.

Figure 8:
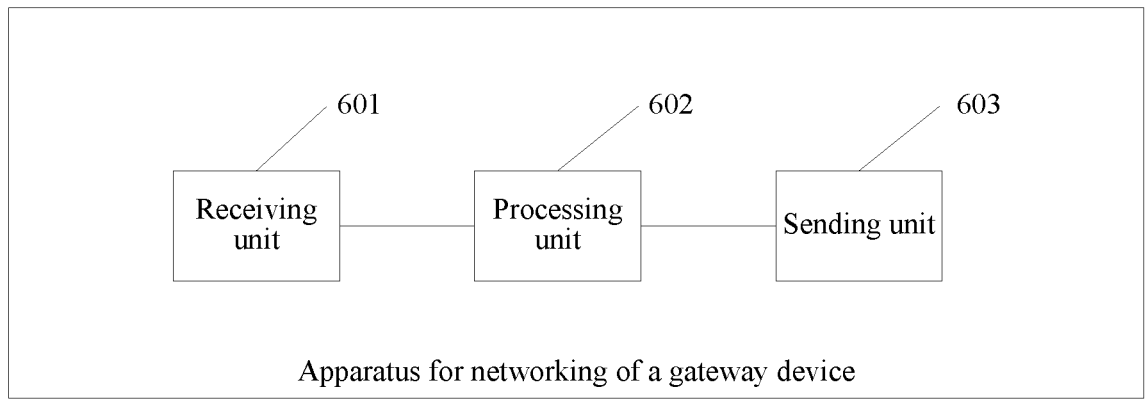
FIG. 8 is a functional block diagram of an apparatus for networking of a gateway device according to another embodiment of this application.

Based on a same inventive concept, referring to FIG. 8, FIG. 8 is a functional block diagram of an apparatus for networking of a gateway device according to an embodiment of this application. The apparatus is configured to implement the method for networking of a gateway device shown FIG. 3 of the present invention. For meanings of terms involved in this embodiment, refer to content described in the foregoing embodiment. The apparatus for networking of a gateway device includes: a receiving unit 601, configured to: after a first gateway device is connected to the gateway device, receive search information sent by the first gateway device, where the search information includes a network identifier; a processing unit 602, configured to determine, according to the network identifier, whether the gateway device and the first gateway device are in a same home network; and a sending unit 603, configured to: when the gateway device and the first gateway device are in the same home network, send response information to the first gateway device to instruct the first gateway device to switch to be a bridge device of the gateway device; and send a network parameter of the gateway device to the first gateway device, where the network parameter includes an SSID of the gateway device and an IP address assigned by the gateway device to the first gateway device, and the IP address is an address in a network segment corresponding to the SSID, that is, the IP address assigned to the first gateway device and an IP address of the second gateway device are in a same network segment.

Optionally, the sending unit 603 is further configured to: when the network parameter is updated, send an updated network parameter to the first gateway device.

Various changed manners and specific examples of the method for networking of a gateway device in the foregoing embodiment of FIG. 3 are also applicable to the apparatus for networking of a gateway device in this embodiment. By means of the detailed description of the foregoing method for networking of a gateway device, a person skilled in the art may clearly know an implementation method of the apparatus for networking of a gateway device in this embodiment. Therefore, for conciseness of this specification, details are not described herein again.

Figure 9:
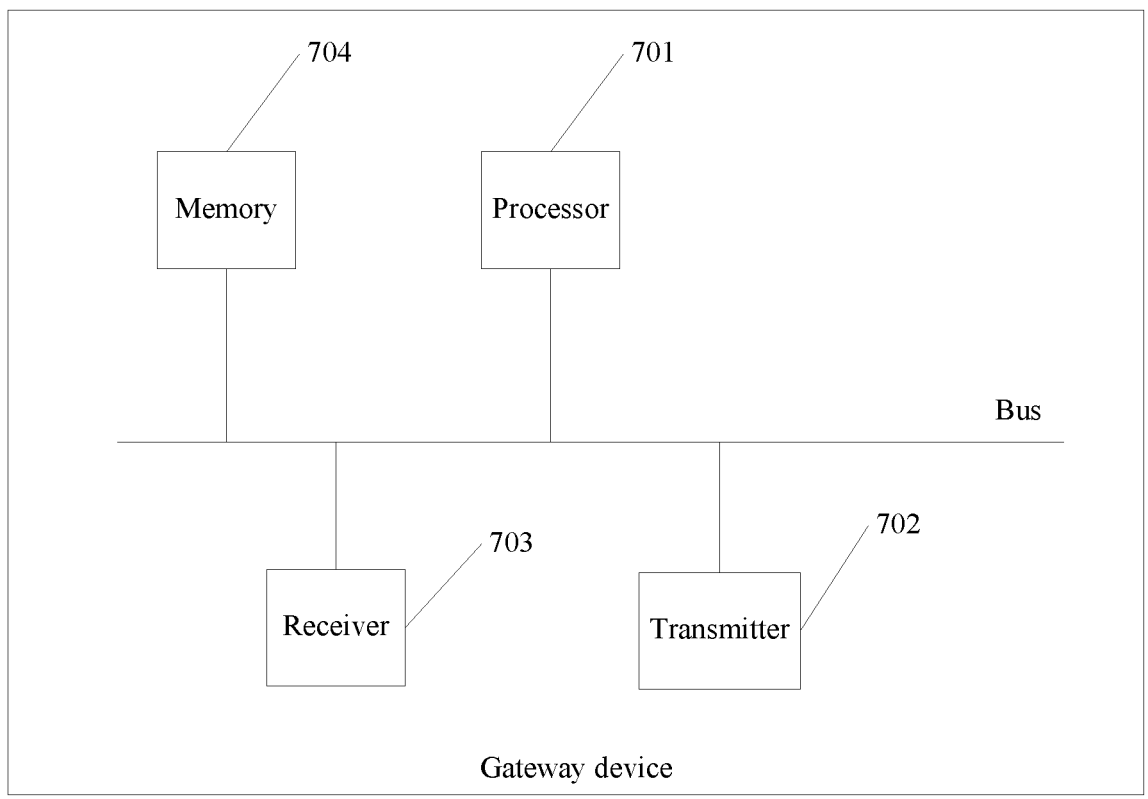
FIG. 9 is a systematic block diagram of a gateway device according to another embodiment of this application.

Based on a same inventive concept, referring to FIG. 9, FIG. 9 is a systematic block diagram of a gateway device according to an embodiment of this application. The apparatus is configured to implement the method for networking of a gateway device shown in FIG. 3 of the present invention. For meanings of term involved in this embodiment, refer to content described in the foregoing embodiment. The gateway device includes: a processor 701, a transmitter 702, a receiver 703, and a memory 704. The processor 701 may be specifically a general purpose central processing unit (CPU), or may be an application specific integrated circuit (English: Application Specific Integrated Circuit, ASIC for short), or may be one or more integrated circuits configured to control execution of a program. There may be one or more memories 704. The memory 704 may include a read-only memory (English: Read-Only Memory, ROM for short), a random access memory (English: Random Access Memory, RAM for short), and a magnetic disk storage. The memories, the receiver 703, and the transmitter 702 are connected to the processor 701 using a bus. The receiver 703 and the transmitter 702 are configured to perform network communication with an external device, and may communicate with the external device specifically by using an Ethernet network, a radio access network, a wireless local area network, and the like. The receiver 703 and the transmitter 702 may be two elements physically independent of each other, or may be physically a same element.

The memory 704 may store an instruction, and the processor 701 may execute the instruction stored in the memory 704.

Specifically, the receiver 703 is configured to: after a first gateway device is connected to the gateway device, receive search information sent by the first gateway device, where the search information includes a network identifier. The processor 701 is configured to determine, according to the network identifier, whether the gateway device and the first gateway device are in a same home network. The transmitter 703 is configured to: when the gateway device and the first gateway device are in the same home network, send response information to the first gateway device to instruct the first gateway device to switch to be a bridge device of the gateway device; and send a network parameter of the gateway device to the first gateway device, where the network parameter includes an SSID of the gateway device and an IP address assigned by the gateway device to the first gateway device, and the IP address is an address in a network segment corresponding to the SSID.

Optionally, the transmitter 702 is further configured to: when the network parameter updated, send an updated network parameter to the first gateway device.

Various changed manners and specific examples of the method for networking of a gateway device in the foregoing embodiment of FIG. 3 are also applicable to the gateway device in this embodiment. By means of the detailed description of the foregoing method for networking of a gateway device, a person skilled in the art may clearly know an implementation method of the gateway device in this embodiment. Therefore, for conciseness of this specification, details are not described herein again.

The one or more technical solutions provided in the embodiments of this application have at least the following technical effects or advantages:

In the embodiments of this application, all gateway devices in a home network use a same network parameter, no matter how many gateway devices there are physically, and from whichever gateway device user equipment connects to the home network, the user equipment uses the same network parameter, and an IP address is an IP address in a network segment corresponding to an upper-level gateway device. Therefore, all user equipments are connected to a same local area network, and multiple user equipments can communicate with each other, thereby facilitating use by a user.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method for automatic networking of a gateway device, the method comprising:
    after a first gateway device is connected to a second gateway device, determining, by the first gateway device, whether the second gateway device and the first gateway device are in a same home network;
    when the first gateway device and the second gateway device are in the same home network, switching, by the first gateway device, to be a bridge device of the second gateway device;
    receiving, by the first gateway device, a network parameter sent by the second gateway device, wherein the network parameter comprises a service set identifier (SSID) of the second gateway device and an Internet Protocol (IP) address assigned by the second gateway device to the first gateway device, and wherein the IP address is an address in a network segment corresponding to the SSID; and
    performing, by the first gateway device, network configuration on the first gateway device according to the network parameter.

2. The method according to claim 1, wherein determining, by the first gateway device, whether the second gateway device and the first gateway device are in a same home network comprises:
    sending, by the first gateway device, search information to the second gateway device, wherein the search information comprises a network identifier;
    receiving, by the first gateway device, response information of the second gateway device, wherein the response information is generated based on the network identifier; and
    determining, by the first gateway device according to the response information, whether the second gateway device and the first gateway device are in the same home network.

3. The method according to claim 2, wherein before sending, by the first gateway device, search information to the second gateway device, the method further comprises:
    determining, by the first gateway device, that the first gateway device is not set to a cascaded mode, wherein in the cascaded mode, the first gateway device is a cascaded device of another network device.

4. The method according to claim 2, wherein sending, by the first gateway device, search information to the second gateway device comprises:
sending, by the first gateway device, search information to the second gateway device by using the Universal Plug and Play (UPnP) protocol.

5. The method according to claim 2, wherein sending, by the first gateway device, search information to the second gateway device comprises:
sending, by the first gateway device, search information to the second gateway device by using the Multicast Domain Name System (MDNS) protocol.

6. The method according to claim 1, wherein the network parameter further includes an authentication password.

7. A gateway device, comprising:
a processor, configured to:
after the gateway device is connected to a second gateway device, determine whether the second gateway device and the gateway device are in a same home network; and
when the gateway device and the second gateway device are in the same home network, switch the gateway device to be a bridge device of the second gateway device;
a receiver, configured to receive a network parameter sent by the second gateway device, wherein the network parameter comprises a service set identifier (SSID) of the second gateway device and an Internet Protocol (IP) address assigned by the second gateway device to the gateway device, and wherein the IP address is an address in a network segment corresponding to the SSID; and
wherein the processor is further configured to perform network configuration on the gateway device according to the network parameter.

8. The gateway device according to claim 7, wherein:
the gateway device further comprises a transmitter; and
the processor is configured to:
send search information to the second gateway device by using the transmitter, wherein the search information comprises a network identifier,
receive response information of the second gateway device by using the receiver, wherein the response information is generated based on the network identifier, and
determine, according to the response information, whether the second gateway device and the gateway device are in the same home network.

9. The gateway device according to claim 8, wherein the processor is further configured to: before sending the search information to the second gateway device by using the transmitter, determine that the gateway device is not set to a cascaded mode, wherein in the cascaded mode, the gateway device is a cascaded device of another network device.

10. The gateway device according to claim 8, wherein to send search information to the second gateway device, the processor is configured to:
send search information to the second gateway device by using the Universal Plug and Play (UPnP) protocol.

11. The gateway device according to claim 8, wherein to send search information to the second gateway device, the processor is configured to:
send search information to the second gateway device by using the Multicast Domain Name System (MDNS) protocol.

12. The gateway device according to claim 7, wherein the network parameter further includes an authentication password.

13. A gateway device, comprising:
a receiver, configured to: after a first gateway device is connected to the gateway device, receive search information sent by the first gateway device, wherein the search information comprises a network identifier;
a processor, configured to determine, according to the network identifier, whether the gateway device and the first gateway device are in a same home network; and
a transmitter, configured to:
when the gateway device and the first gateway device are in the same home network, send response information to the first gateway device to instruct the first gateway device to switch to be a bridge device of the gateway device, and
send a network parameter of the gateway device to the first gateway device, wherein the network parameter comprises a service set identifier (SSID) of the gateway device and an Internet Protocol (IP) address assigned by the gateway device to the first gateway device, and wherein the IP address is an address in a network segment corresponding to the SSID.

14. The gateway device according to claim 13, wherein the transmitter is further configured to: when the network parameter is updated, send an updated network parameter to the first gateway device.

15. The gateway device according to claim 13, wherein the network parameter further includes an authentication password.

* * * * *